United States Patent
Lundby et al.

(10) Patent No.: US 7,724,701 B2
(45) Date of Patent: May 25, 2010

(54) METHOD AND APPARATUS FOR CONTROLLING REVERSE LINK DATA RATE OF A MOBILE STATION IN A COMMUNICATION SYSTEM WITH REVERSE LINK COMMON RATE CONTROL

(75) Inventors: Stein A. Lundby, Solana Beach, CA (US); Gang Bao, San Diego, CA (US); Avinash Jain, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1490 days.

(21) Appl. No.: 10/853,638

(22) Filed: May 24, 2004

(65) Prior Publication Data

US 2005/0201280 A1    Sep. 15, 2005

Related U.S. Application Data

(60) Provisional application No. 60/507,907, filed on Sep. 30, 2003.

(51) Int. Cl.
*H04W 4/00* (2009.01)
(52) U.S. Cl. ..................................... 370/328
(58) Field of Classification Search ........................ None
See application file for complete search history.

(56) References Cited

U.S. PATENT DOCUMENTS

| | | | |
|---|---|---|---|
| 6,425,105 B1 | 7/2002 | Piirainen et al. | |
| 6,571,089 B1 | 5/2003 | Richards et al. | |
| 6,595,659 B2 | 7/2003 | Wong | |
| 6,628,956 B2 | 9/2003 | Bark et al. | |

| | | | |
|---|---|---|---|
| 6,819,935 B2 | 11/2004 | Kenney et al. | |

(Continued)

FOREIGN PATENT DOCUMENTS

RU    2114508    6/1998

(Continued)

OTHER PUBLICATIONS

Iinternational Search Report-PCT/US04/030966, International Search Authority-European Patent Office, Mar. 17, 2005.

(Continued)

*Primary Examiner*—Anh-Vu Ly
(74) *Attorney, Agent, or Firm*—Sayed Hossein Beladi; Donald C. Kordich (57) ABSTRACT

An efficient use of communication resources is provided by determining a behavior for selecting the payload size (data rate) of a reverse link transmission from a mobile station to a base station. The mobile station may store a predetermined table including the ratio of the power levels of the traffic channel and pilot channel (TPR), where each entry corresponds to one or more specific sizes of data payload, and consequently a data rate for transmission in a predetermined time frame. The payload size is selected based on an authorized-TPR. The authorized-TPR and a target-TPR are adjusted in accordance with a value of common TPR commands received from the base station. A fast-ramp-up behavior for adjustments of the authorized-TPR is followed when the authorized-TPR is less than the target-TPR. The down TPR commands are ignored in the adjustments of the authorized-TPR to allow following a fast-ramp-up behavior.

26 Claims, 7 Drawing Sheets

U.S. PATENT DOCUMENTS

| | | | |
|---|---|---|---|
| 6,836,666 B2 | 12/2004 | Gopalakrishnan et al. | |
| 6,898,437 B1 | 5/2005 | Larsen et al. | |
| 7,046,966 B2* | 5/2006 | Davis | 455/69 |
| 7,068,683 B1* | 6/2006 | Lundby et al. | 370/493 |
| 7,069,037 B2* | 6/2006 | Lott et al. | 370/318 |
| 7,092,731 B2 | 8/2006 | Gopalakrishnan et al. | |
| 7,110,785 B1* | 9/2006 | Paranchych et al. | 370/333 |
| 7,190,964 B2* | 3/2007 | Damnjanovic et al. | 455/522 |
| 7,193,976 B2 | 3/2007 | Chun | |
| 7,194,280 B2* | 3/2007 | Vanghi | 455/522 |
| 7,215,653 B2* | 5/2007 | Kim et al. | 370/329 |
| 2001/0053128 A1 | 12/2001 | Lee | 370/244 |
| 2002/0150077 A1 | 10/2002 | Temerinac | |
| 2003/0039267 A1 | 2/2003 | Koo et al. | 370/465 |
| 2003/0078010 A1 | 4/2003 | Davis | 455/69 |
| 2003/0081572 A1 | 5/2003 | Kim et al. | 370/332 |
| 2003/0218997 A1* | 11/2003 | Lohtia et al. | 370/335 |
| 2005/0124372 A1* | 6/2005 | Lundby et al. | 455/522 |
| 2005/0135320 A1* | 6/2005 | Tiedemann et al. | 370/338 |

FOREIGN PATENT DOCUMENTS

| | | |
|---|---|---|
| RU | 2156545 | 9/2000 |
| RU | 2163051 | 11/2000 |
| WO | 0070902 | 11/2000 |
| WO | 01078291 | 10/2001 |
| WO | 02052757 | 7/2002 |

OTHER PUBLICATIONS

3rd Generation Partnership Project 2 "3GPP2" Medium Access Control (MAC) Standard for cdma2000 Spread Spectrum Systems Release D Version 1.0, Feb. 13, 2004, pp. 187-192.

Mandyam G et al., "Adaptive Power Allocation in Mixed-QoS CDMA Systems", Institute of Electrical and Electronics Engineers, Conference Record of the 35th. Asilomar Conference on Signals, Systems, & Computers. Pacific Groove, CA, Nov. 4-7, 2001, IEEE, vol. 1 of 2. Conf.35, pp. 705-708, XP010581010, ISBN: 0-7803-7147-X.

Nandagopal et al., "Service Differentiation through End-to-End Rate Control in Low Bandwidth Wireless Packet Networks", IEEE Proceedings 2003, Mar. 16, 2003, pp. 1334-1338; XP010639961.

Sarkar S et al.,"Adaptive Control of the Reverse Link in CDMA2000", International Journal of Wireless Information Networks, Plenum Press, New York, NY, US, vol. 9, No. 1, Jan. 2002, pp. 55-70, XP002300880, ISSN: 1068-9605.

Song et al., "Rate-Control Snoop: A Reliable Transport Protocol for Heterogeneous Networks with Wired and Wireless Links", Mobile Multimedia Communications, 1999 IEEE Int'l Workshop, Nov. 15, 1999, pp. 211-220; XP010370726.

TIA/EIA/IS-95-A "Mobile Station-Base Station Compatibility Standard for Dual-Mode Wideband Spread Spectrum Cellular System", Jul. 1993.

Yun L C et al., "Power Control for Variable QOS on a CDMA Channel", Military Communications Conference, 1994. MILCOM '94. Conference Record, IEEE Fort Monmouth, NJ, USA Oct. 2-5, 1994, New York, NY, USA, IEEE, US, pp. 178-180, XP010149801, ISBN: 0-7803-1828-5.

Yun L C et al., "Variable Quality of Service in CDMA Systems by Statistical Power Control", Communications—Gateway to Globalization. Proceedings of the Conference on Communications. Seattle. Jun. 18-22, 1995, vol. 2, Jun. 18, 1995, pp. 713-719, XP000533105.

Written Opinion. PCT/US2004/030966, International Searching Authority, European Patent Office, Mar. 17, 2005.

International Preliminary Report on Patentability, PCT/US2004/030966, International Preliminary Examining Authority, United States, Sep. 20, 2006.

* cited by examiner

| Index | Payload Size | Data Rate (bps) | Minimum Authorized TPR (db) |
|---|---|---|---|
| 1 | 192 | 19200 | 1.52 |
| 2 | 384 | 38400 | 4.42 |
| 3 | 768 | 76800 | 7.26 |
| 4 | 1536 | 153600 | 10.04 |
| 5 | 3072 | 307200 | 12.87 |
| 6 | 4608 | 460800 | 14.72 |
| 7 | 6144 | 614400 | 15.63 |
| 8 | 9216 | 921600 | 17.37 |
| 9 | 12288 | 1228800 | 18.79 |

METHOD AND APPARATUS FOR CONTROLLING REVERSE LINK DATA RATE OF A MOBILE STATION IN A COMMUNICATION SYSTEM WITH REVERSE LINK COMMON RATE CONTROL

CLAIM OF PRIORITY UNDER 35 U.S.C. §119

The present Application for Patent claims priority to Provisional Application No. 60/507,907 entitled "Data Rate Control For Reverse-Link in a Communication System" filed Sep. 30, 2003, and assigned to the assignee hereof and hereby expressly incorporated by reference herein.

FIELD

The present invention relates generally to the field of communications, and more particularly, to controlling data rate of reverse link communications in a communication system.

BACKGROUND

In a multiple-access communication system, many remote stations transmit data to a central station as a part of maintaining an overall communication link between each remote station and the central station. To avoid congestion and efficiently managing the communication resources, the central station may control the transmissions from the remote stations by either an explicit resource assignment or a command that broadcasts the congestion state of the communication resources. In a wireless communication system, a base station may be the central station and the mobile stations may be the remote stations. However, managing allocation of resources in terms of communications data rate from the mobile stations to the base station, is often difficult and less than optimum due to many factors. Therefore, there is a need for a method and apparatus to use an optimum data rate for a mobile station under most channel conditions permitted by transmissions from other mobile stations.

SUMMARY

Generally stated, a reverse link data rate may be controlled via a dedicated rate control or a common rate control channel. A method and apparatus is provided for efficient control of multiple-access reverse link transmissions when common control information is sent to all the remote stations. The data rate of the reverse link may be based on the value of an authorized traffic to pilot channel power ratio (authorized-TPR). In a predetermined fashion, a table may provide various values of TPR corresponding to various ranges of data rates. In a system where a time frame with fixed duration is used for transmission, a table may provide various values of TPR corresponding to various ranges of payload sizes. In such a case, a payload size corresponds to a transmission data rate. Therefore, once the authorized-TPR is known, a data rate (i.e. payload size) for communications may be selected. Another variable such as a target-TPR may indicate an estimate of a target for the authorized-TPR. Generally, the target-TPR and authorized-TPR may be adjusted based on the TPR commands (data rate common control commands) received from a base station. The base station may determine the TPR commands based on a measured rise over thermal power received at the base station. A fast-ramp-up behavior of adjusting authorized-TPR is followed when the authorized-TPR is less than the target-TPR, in accordance with an aspect of the invention. A received up TPR command would raise the target-TPR and authorized-TPR, a down TPR command would lower the target-TPR and authorized-TPR, and a hold TPR command would keep the target-TPR and authorized-TPR at the same level, generally. In accordance with an embodiment, the authorized-TPR may not be adjusted downward when a down TPR command is received during the fast-ramp-up mode. The fast-ramp-up mode may be determined based on a current value of the authorized-TPR and target-TPR. If the authorized-TPR is below the target-TPR, the fast-ramp-up mode is enabled, otherwise, the authorized-TPR is adjusted in a normal mode, in accordance with various aspects of the invention.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENT(S)

To control the transmissions from the mobile stations (reverse link or uplink), a base station may transmit a command to increase or decrease or hold the transmission power level of the traffic channel transmitted from the mobile stations. In a communication system where the power levels of a reverse pilot channel in conjunction with traffic channel are controlled, the traffic channel power level may be normalized with respect to transmission power level on the pilot channel; such a normalization may be represented as traffic-to-pilot-channel-power-ratio (TPR). An independent power control process may adjust the reverse pilot channel power level. The power level of the traffic channel is then based on the TPR with respect to the pilot channel power level. The control command from the base station therefore assigns and modifies the TPR of the traffic channel, thereby affecting the transmission power level of the traffic channel. The selection of TPR may be mapped directly to a selection of the payload size of the data packet, and consequently the transmission data rate in a predetermined transmission time frame.

To modify the TPR of the mobile stations, the base station may determine the up, down or hold commands based on a number of factors that affect the congestion level in the system. The congestion level of a system may be a function of the communication load produced by the transmissions from the mobile stations in the coverage area of the base station. In interference-limited CDMA systems, the congestion on reverse link may be measured by rise-over-thermal. Rise-over-thermal (ROT) is the ratio of total received power at the base station antenna and the thermal noise. The base station may attempt to maintain ROT of the system below a desired threshold for communication stability of the system. When a common control command for adjusting the mobile stations TPR is sent to all mobile stations in the coverage area of a base-station, the UP control command may signify that the system is unloaded (or ROT is below a desired threshold), while a DOWN control command may signify that the system is loaded and is in the congested state or near a congested state.

In most systems, due to practical limitations, the transmissions on traffic channel may be in accordance with a set of quantized data rate values that correspond to a set of quantized TPR values. When a common control command for adjusting TPR is received by the mobile stations, the data rate change to another quantized level by multiple mobile stations at the same time may lead to large variations in received power (ROT) at the base station. Therefore, a mobile station after receiving a control command may change the data rate and the transmitted TPR with certain probability. In such a case, the received control command (whether it is an up, or down or hold command) is used in a statistical function to determine the actual command that may be used at the mobile station. As a result, based on the statistical function properties, large variations in received ROT at the base station may be avoided. However, such probabilistic changes in data rate and transmitted TPR may have slow and variable response time. A rate transition function that deterministically changes its value when a TPR command is received provides a more controlled behavior of the response time. Various aspects of the invention provide for a method and apparatus to deterministically change the value of TPR at the mobile station.

Once a mobile station begins a communication call on the reverse link, the mobile station may start at a very low TPR, or a TPR selected from a TPR table loaded in the memory portion of the mobile station. The initial value selected may be the autonomous TPR that the mobile station can use for its reverse link transmission without any supervision, or the one that the base station assigns to the mobile station. After the initial selection, the mobile station may follow a common control command from the base station to adjust the TPR and, consequently, the reverse link data rate. The overall effect is that each mobile station after receiving a series of commands for adjusting the TPR value adapts its reverse link transmissions data rate (i.e. power level) to the changes in the congestion level in the system caused by other mobile stations. However, for a number of transmissions during a data call, the mobile station may be transmitting at a data rate (TPR) that is much lower than a possible data rate permitted by the actual congestion state of the system. First, the initial selection may be too conservative if the system does not have provisions for a negotiated reverse link data rate (TPR) selection. Even when there are provisions for negotiations, negotiations introduces delay, consumes resources and it may be too difficult for the base station to predict congestion level and assigns data rate (TPR) to the mobile station. Therefore, when a mobile station has sufficient data and power headroom for reverse link transmission, it is highly desirable to use a data rate that closely takes advantage of the available reverse link capacity. The reverse link capacity depends on the load (ROT) produced by all other mobile stations in the coverage area of the base station.

Each mobile station in the communication system in accordance with an embodiment may maintain a variable called authorized traffic to pilot power ratio (authorized-TPR). The authorized-TPR is mapped to the maximum possible transmission data rate or payload size that the mobile station is allowed to use for transmission. The authorized-TPR may be adjusted deterministically based on TPR commands (i.e. control commands for adjusting the TPR value at the mobile station, or any other data rate/TPR control information) received from a base station. The received TPR commands may include up, down and hold commands, and may be used by all mobile stations in the coverage area of the base station to adjust the authorized-TPR. Such an adjustment may be gradual. For example, multiple up or down TPR commands may be required to accordingly change the TPR value used for a subsequent transmission. Therefore, in a deterministic update, the authorized-TPR adjustments may be more granular than the granularity of the TPR values corresponding to the quantized data rates in the pre-determined TPR table. From the selected TPR, payload size and hence the data rate is selected. In an embodiment, the mobile station may be required to transmit at the selected payload size corresponding to the TPR specified in the pre-determined TPR table.

The mobile station may not have enough data in its buffer or enough power to transmit at a data rate determined from the authorized-TPR. In that case, the mobile station may transmit at a lower data rate or payload size. If the mobile station is not transmitting or transmitting at a data rate or payload size lower than the maximum allowed determined from authorized-TPR, the authorized-TPR may be adjusted (i.e. to correspond to a lower TPR) based on the selected TPR. In accordance with an embodiment, the authorized-TPR is re-initialized to a TPR corresponding to the transmitted payload size if the transmitted payload size is lower than the maximum allowed payload size. In another embodiment, the authorized-TPR may be decreased in small steps if the transmitted payload size is lower than the maximum allowed payload size. The correction (adjustments) of the authorized-TPR based on the TPR that is actually used for transmission, reduces the difference between the actual congestion state of the system and the congestion state determined by the base station from the feedback it receives in form of the actual authorized-TPR used by the mobile stations in the reverse link transmissions.

Furthermore, in accordance with an embodiment, the mobile station may maintain a variable called target-TPR. The target-TPR indicates an estimate of a target for the authorized-TPR. For example, if the authorized-TPR is smaller than the target-TPR, the mobile station current transmission is at a data rate smaller than what mobile station could possibly transmit, considering the load conditions in the systems. In such a case, the mobile station may ramp up the authorized-TPR to reach the target-TPR or a value close to the target-TPR. Since the target-TPR is an estimate and may not be accurate, as a safeguard against any inaccuracy, the mobile station ramps up the authorized-TPR in steps while keeping a margin below the target-TPR. The target-TPR and authorized-TPR values may be adjusted in accordance with the TPR commands received from the base station. An up command increases both the target-TPR and the authorized-TPR, similarly, a down command changes the parameters downward, a hold command may keep the parameters unchanged. In accordance with an embodiment, a fast-ramp-up behavior may be followed when the authorized-TPR is less than the target-TPR. The authorized-TPR is increased so that the mobile station increases its transmission data rate to the next higher rate in the pre-determined TPR table whenever an up or hold TPR command is received during the fast ramp up mode. In accordance with another embodiment, the mobile station may keep the authorized-TPR unchanged when a down command is received in the fast ramp-up mode.

The mobile station adapts the target-TPR in accordance with the changes in the congestion state of the system. In case of common rate control, the TPR control command sent by each base station notifies every mobile station in the coverage area about some measure of the congestion or load in the system. In case of a tri-state up, down or hold TPR control command, up refers to the fact that the system is unloaded while down refers to the fact that the system is loaded. The update in target-TPR may therefore be based on the received TPR control command. In an exemplary embodiment, target-TPR is updated by a similar step up and step down values as the authorized-TPR when the mobile station is not in the fast ramp-up mode. In case of the fast ramp up mode, the target-TPR is adjusted in accordance with the value of the received TPR control command and the authorized-TPR is adjusted in accordance with the fast ramp-up behavior. The target-TPR may be updated every frame, even when the mobile station is not transmitting on the reverse-link.

One or more exemplary embodiments described herein are set forth in the context of a digital wireless data communication system. While use within this context is advantageous, different embodiments of the invention may be incorporated in different environments or configurations. In general, the various systems described herein may be formed using software-controlled processors, integrated circuits, or discrete logic. The data, instructions, commands, information, signals, symbols, and chips that may be referenced throughout the application are advantageously represented by voltages, currents, electromagnetic waves, magnetic fields or particles, optical fields or particles, or a combination thereof. In addition, the blocks shown in each block diagram may represent hardware or method steps.

More specifically, various embodiments of the invention may be incorporated in a wireless communication system operating in accordance with the code division multiple access (CDMA) technique which has been disclosed and described in various standards published by the Telecommunication Industry Association (TIA) and other standards organizations. Such standards include the TIA/EIA-95 standard, TIA/EIA-IS-2000 standard, IMT-2000 standard, UMTS and WCDMA standard, all incorporated by reference herein. A system for communication of data is also detailed in the "TIA/EIA/IS-856 cdma2000 High Rate Packet Data Air Interface Specification," incorporated by reference herein. A copy of the standards may be obtained by accessing the World Wide Web or by writing to TIA, Standards and Technology Department, 2500 Wilson Boulevard, Arlington, Va. 22201, United States of America. The standard generally identified as UMTS standard, incorporated by reference herein, may be obtained by contacting 3GPP Support Office, 650 Route des Lucioles-Sophia Antipolis, Valbonne-France.

Figure 1:
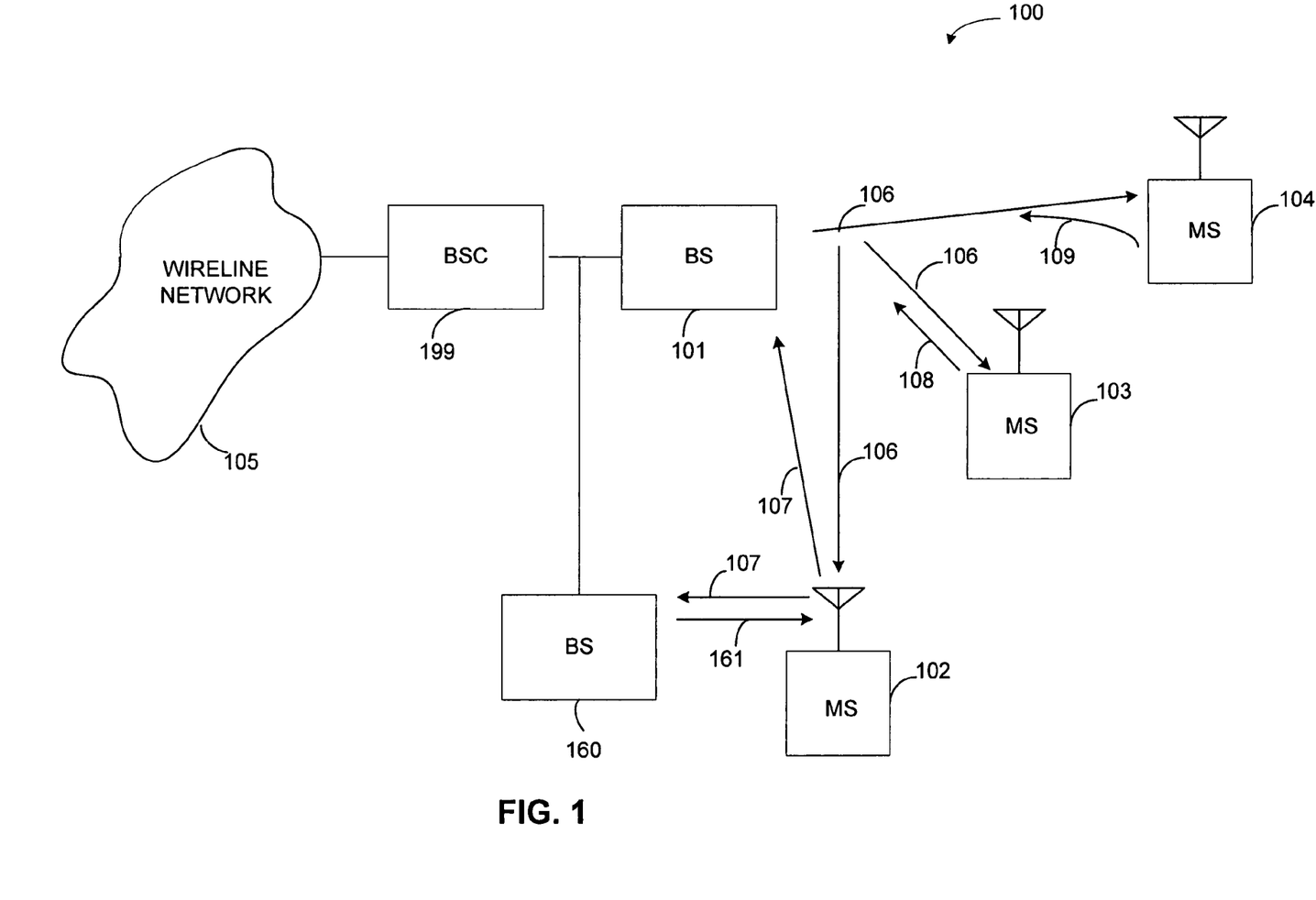
FIG. 1 depicts a communication system for communications in accordance with various aspects of the invention.

FIG. 1 illustrates a general block diagram of a communication system 100 capable of operating in accordance with any of the code division multiple access (CDMA) communication system standards while incorporating various embodiments of the invention. Communication system 100 may be for communication of voice, data or both. Generally, communication system 100 includes a base station 101 that provides communication links between a number of mobile stations, such as mobile stations 102-104, and between the mobile stations 102-104 and a wireline network 105 including a public switch telephone and data network. Base station 101 may include a number of components, such as a controller and a transceiver system. For simplicity, such components are not shown. Base station 101 may be in communication with other base stations, for example base station 160. Base stations 101 and 160 and various control nodes, not shown, may control various operating aspects of the communication system 100 and in relation to a back-haul 199 between network 105 and base stations 101 and 160.

Base station 101 communicates with each mobile station that is in its coverage area via a forward link signal. The forward link signals targeted for mobile stations 102-104 may be summed to form a forward link signal 106. The forward link may carry a number of different forward link channels. A control channel may also be included which may be shared among the mobile stations for receiving control information. Such a common control channel may be utilized to transmit common data control (TPR control command) information to all mobile stations. The TPR control command may be in the form of a one-bit command. The common rate control channel, therefore, transmits a one-bit information, indicating +1, 0, or −1 for, respectively, increasing, holding or decreasing the traffic to pilot channel power level ratio (TPR command) of the reverse link. The base station determines the TPR command based on a number of factors, including the rise of the transmit power level of the reverse link over a thermal energy, i.e. rise over thermal (ROT). The base station attempts to maintain a ROT level; therefore, if the ROT exceeds a threshold, the base station transmits a down command, otherwise an up or hold command may be appropriate.

Base station 160 may also communicate with the mobile stations that are in its coverage area via a forward link signal transmitted from base station 160. Similar operation relating to the transmission of TPR command may be performed by the base station 160. Mobile stations 102-104 may communicate with base stations 101 and 160 via corresponding reverse links. Each reverse link is maintained by a reverse link signal, such as reverse link signals 107-109 for respectively mobile stations 102-104. The reverse link signals 107-109, although may be targeted for one base station, it may be received (and decoded as well) at other base stations. Since the mobile stations may move from one location to another and/or the channel condition may change, the mobile stations may keep an active set of base stations that may use for communications. In accordance with an embodiment, if the TPR command from all base stations in the active set of a mobile station indicates an up TPR command, the mobile station follows an up TPR command. In accordance with an embodiment, if any one of the base stations in the active set of a mobile station transmits a down TPR command, the mobile station would follow a down TPR command, even though other base stations in the active set may have sent an up TPR command. As such, the mobile stations may not transmit at a TPR level that exceeds the expectation of at least one base station in the active set of the base stations. The mobile station, therefore, consolidates all TPR commands into one received TPR command for determining and adjusting the target-TPR and authorized-TPR in the mobile station for the reverse link transmission, in accordance with various aspects of the invention.

Figure 2:
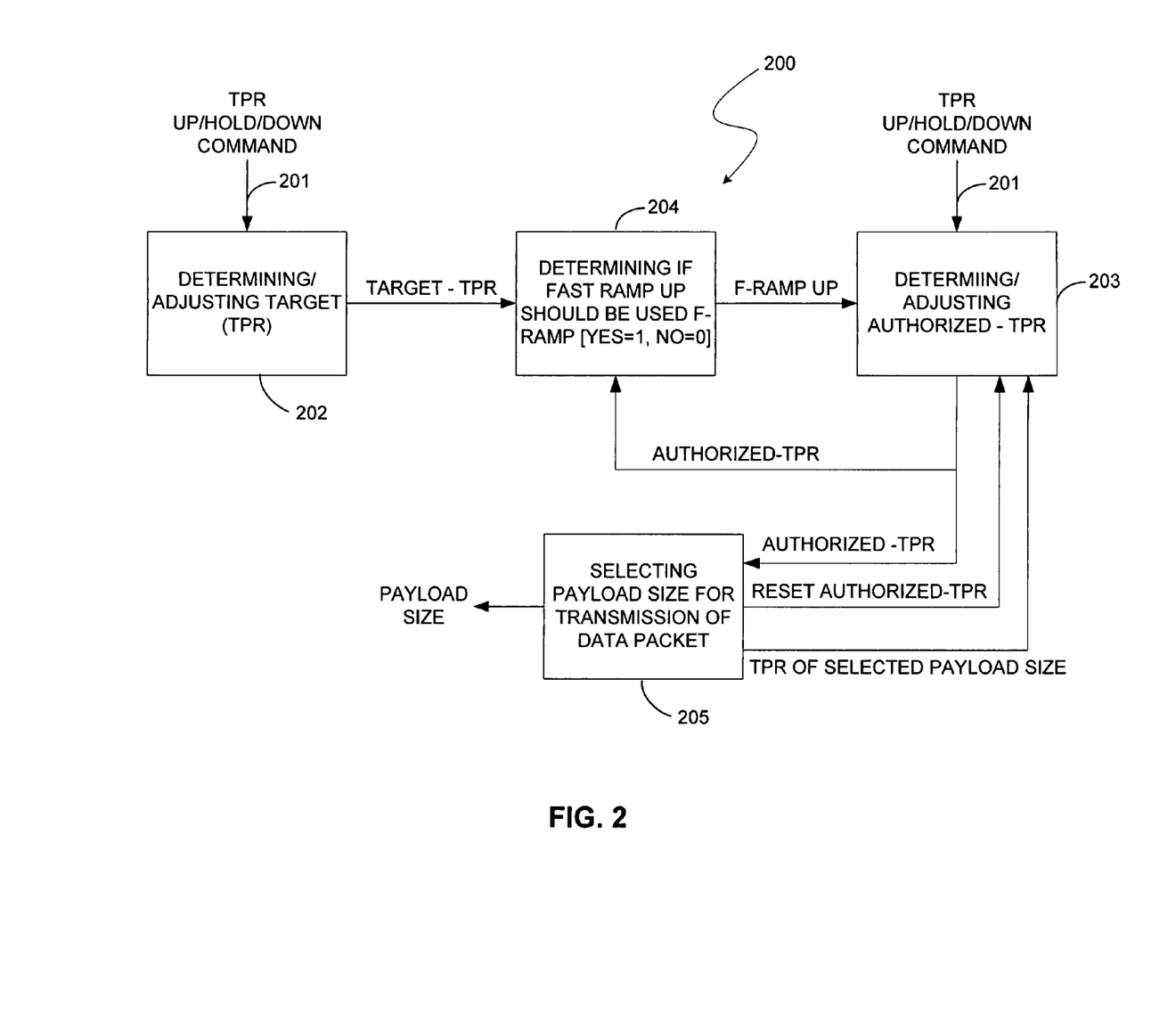
FIG. 2 depicts flow diagram of various steps for controlling and selecting payload size of a transmission in accordance with various aspects of the invention.

Various aspects of the invention may be more apparent while referring to a process flow 200 depicted in FIG. 2. The TPR commands are received via TPR command 201. A receiver in the mobile station may include a number of components and processing units to receive and process a signal carrying a control channel carrying such TPR commands. The TPR command 201 is passed on to processing blocks 202 and 203. The processing block 202 keeps track of the received TPR commands for determining and adjusting a target-TPR parameter.

Figure 3:
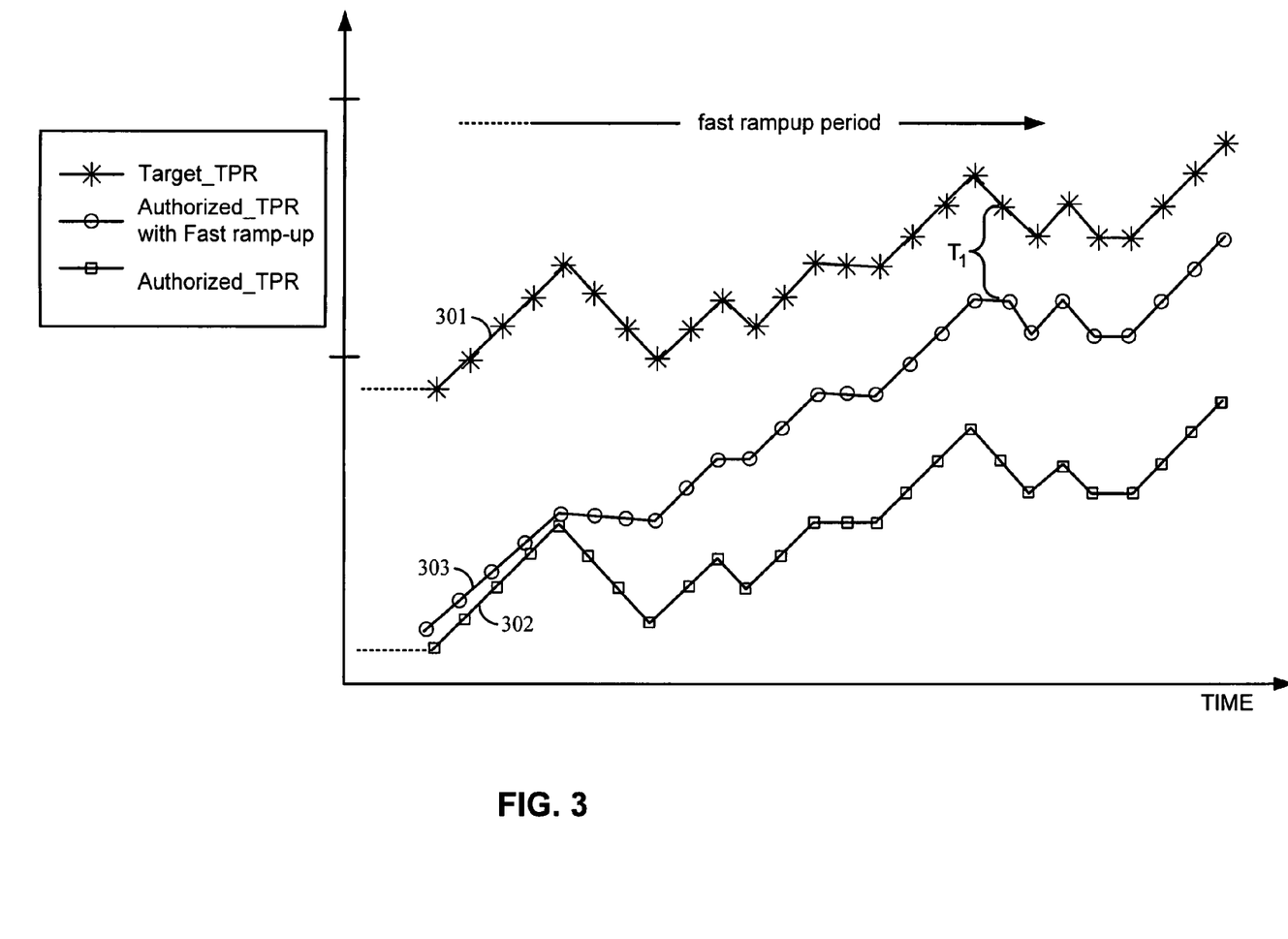
FIG. 3 depicts graphs of target-TPR and authorized-TPR in normal mode and fast ramp-up mode in accordance with various aspects of the invention.

Referring to FIG. 3, an exemplary graph 301 of target-TPR with respect to time is shown, each data point may represent adjustment due to one or more received TPR command. The processing block 202 adjusts the target-TPR upward when it receives an up TPR command, downward when it receives a down TPR command and holds the target-TPR steady at the same level when it receives a hold TPR command. All mobile stations keep track of a target-TPR. The level of the target-TPR at each mobile station may not be exactly the same. The level of the target-TPR at each mobile station depends on the history of the received TPR commands and for the length of time that the mobile station has been tracking the received TPR commands. All mobile stations with the same active set size and those receiving the TPR command with sufficient reliability for a long period of time, will have on an average roughly the same target-TPR. Given the nature of a congestion control system, irrespective of the initial value selected for the target-TPR, long-term steady-state average value is dependent on the load offered by the system and is representative of the mobile station's share in the reverse link capacity. The initial value of target-TPR may be chosen at an arbitrary level but at a small level such that it would be smaller than the target-TPR values of other mobile stations in the system that have been tracking the target-TPR for a long time. This is a conservative approach as in the beginning of the call set-up, estimate of the long-term target-TPR is relatively coarse.

The processing block 203 adjusts the authorized-TPR upward when it receives an up TPR command, downward when it receives a down TPR command and holds the authorized-TPR steady at the same level when it receives a hold TPR command, generally. The level of the authorized-TPR at each mobile station may not be the same. The level of the authorized-TPR at each mobile station depends on the history of the received TPR commands and for the length of time that the mobile station has been tracking the received TPR commands. The communication system 100 may utilize a hybrid ARQ scheme in transmission and reception of data packets. For example, if several consecutive (or dispersed) transmissions of a packet of data fail to be received at the destination in one ARQ instance, a new transmissions (a new ARQ instance) may be started. In case of systems that have hybrid ARQ, a mobile station may update its authorized-TPR in response to the received TPR command only when a new transmission is started. Further, there may be times when a mobile station does not have data or power to transmit at a payload size determined by authorized-TPR. In such scenarios, the authorized-TPR may be adjusted to a lower level. As a result, the authorized-TPR determined and adjusted by the processing block 203 may be at a different level in one mobile station than the authorized-TPR in another mobile station that has much less history of receiving TPR commands and been less active in transmission of data. The initial value of authorized-TPR may be chosen at an arbitrary level. More importantly, the authorized-TPR at each mobile station depends on the payload size of the packet of data selected for transmission. Generally, larger payload sizes require higher authorized-TPR. Therefore, a mobile station while selecting to transmit a small size payload of packet of data, its authorized-TPR is also adjusted to reflect the small payload size. Therefore, the authorized-TPR in different mobile stations may be different, and the adjustments of the authorized-TPR may be due to factors other than the value of received TPR commands.

The authorized-TPR at times is adjusted and maintained to be lower than or comparable to the level of the target-TPR in a mobile station. In an embodiment, the target-TPR may be updated at every frame even when the next transmission is a re-transmission in one ARQ instance, and the authorized-TPR is updated only when the next transmission is a new transmission (a new ARQ instance). In such a scenario, it may happen that authorized-TPR is slightly higher than target-TPR due to the random nature of TPR commands. However, fast ramp-up mode is disabled when the authorized-TPR is comparable or higher than the target-TPR. In another embodiment, the mobile station may be forced to keep its authorized-TPR strictly smaller than target-TPR.

In FIG. 3, the authorized-TPR (graph 302) is shown to be selected at a level less than the target-TPR at all times. The graph 301 depicts an exemplary flow of target-TPR determined and adjusted by processing block 202. The target-TPR is shown to be adjusted based on an exemplary series of up, down, and hold TPR commands. Each data point may represent the effect from receiving one TPR command. The graph 302 depicts an exemplary flow of authorized-TPR determined and adjusted by processing block 203. The authorized-TPR is shown to be adjusted based on an exemplary series of up, down, and hold TPR commands. Each data point may represent the effect from receiving one TPR command. The graph 303 depicts an exemplary flow of authorized-TPR determined and adjusted by processing block 203 with fast-ramp up enabled, in accordance with various aspects of the invention. The authorized-TPR graph 303 is shown to be adjusted based on an exemplary series of up, down, and hold TPR commands, except that during the fast-ramp up period, the down command is ignored. The down command is ignored by holding the authorized-TPR at the same level as though a hold TPR command is received. The difference between the authorized-TPR graph 303 and target-TPR graph 301 may be difference at different times, until the authorized-TPR graph 303 reaches within a threshold (T) of target-TPR graph 301. Any up, down, hold commands received at processing blocks 203 and 202 is used to adjust the target-TPR and authorized-TPR during the normal mode (when the fast ramp-up is disabled.) The fast ramp up is enabled when the difference between the target-TPR and authorized-TPR is more than a level comparable to the threshold (T). It is important to note that the authorized-TPR reaches within a range of target-TPR very quickly when fast ramp up is enabled. This is an aspect of the invention to allow very effectively bringing the authorized-TPR to be within a threshold (T) of target-TPR to take a maximum advantage of communication resources. Note that even though the graphs in FIG. 3 shows the graphs of authorized-TPR 302 and 303 are less than the target-TPR, the graph of authorized-TPR 303 with fast ramp up may be allowed to reach the target-TPR before the fast ramp up mode is disabled. In such a case, the values of authorized-TPR could reach to be the same as the target-TPR. However, as a design choice, the authorized-TPR may be kept less than the target-TPR.

Figure 4:
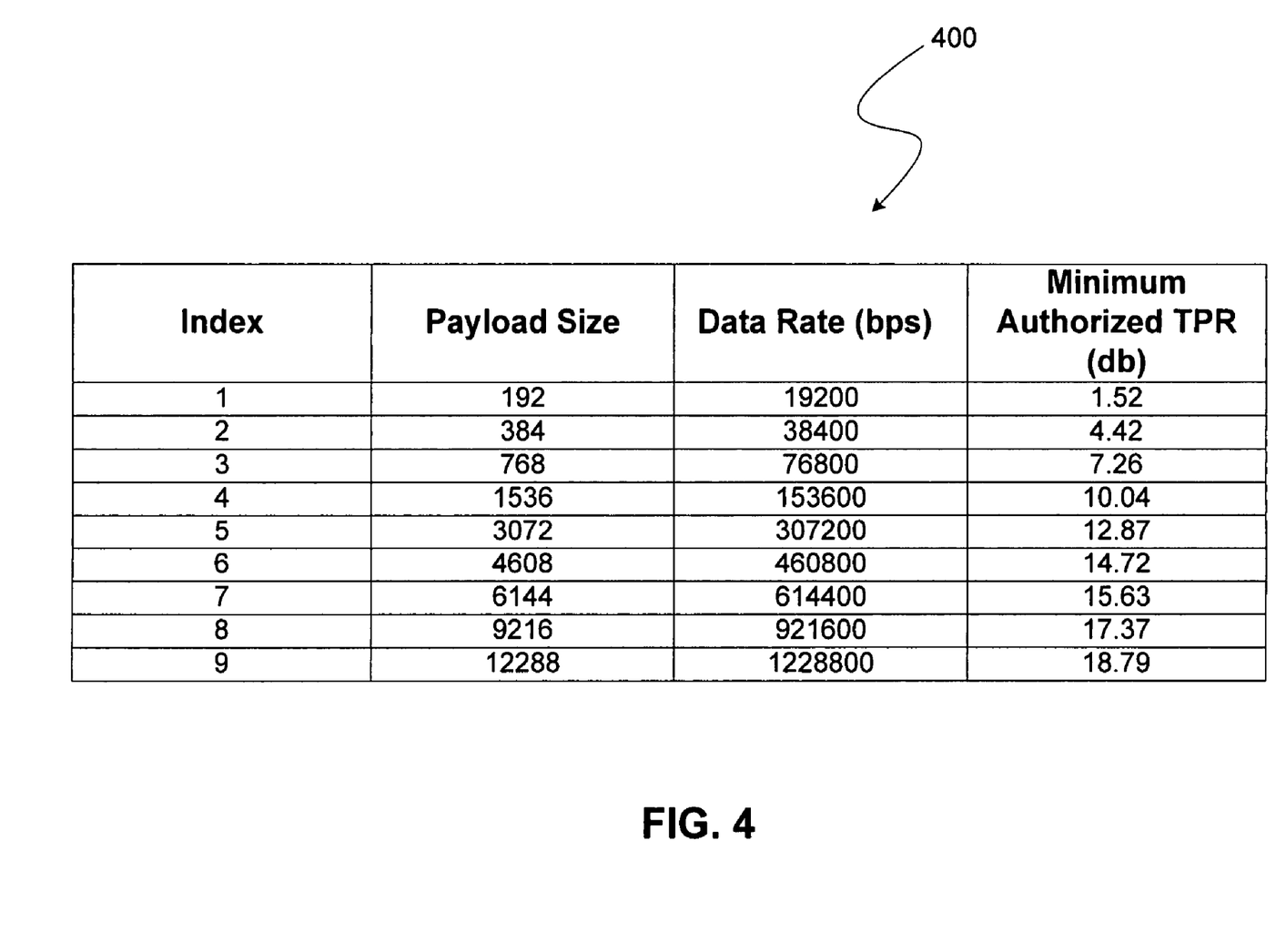
FIG. 4 depicts a table of different values of the authorized-TPR and corresponding payload size and data rates.

In a process for selecting the payload size, the selected authorized-TPR is provided to a processing block 205. The processing block 205 compares the authorized-TPR to a set of available payload sizes. Referring to FIG. 4, a table 400 is an exemplary table showing various payload sizes and corresponding minimum required authorized-TPR. For example, for index 4, the minimum required authorized-TPR is 10.04 dB. Therefore, if the processing block 203 determines that the authorized-TPR is greater than 10.04 dB and lower than 12.87 dB, the largest payload size of 1536 bits may be selected by processing block 205. The packet of data in a modulator of the transmitter should be at most (considering other overhead bits, etc.) 1536 bits long for transmission in one time frame. In this case, for a time frame of 10 msec., the data rate would be 153.6 Kbps. Since smaller payload sizes require less authorized-TPR, as shown, the processing block 205 may select a payload size that is less than the maximum payload size allowed by the authorized-TPR. This may be done if the mobile station does not have data corresponding to the selected payload size or it does not have power to transmit at the largest selected payload size. In this example, the processing block 205 may select a payload size corresponding to a different index having a lower required authorized-TPR. The processing block 205 communicates the TPR corresponding to the selected payload size to processing block 203. If the processing block 205 has selected a payload size smaller than the largest payload size allowed by the authorized-TPR communicated from processing block 203, the processing block 205 sends a reset command to reset the authorized-TPR value at the processing block 203 to an authorized-TPR value corresponding to the selected payload size, in accordance with an embodiment. The processing block 203 continues to adjust the authorized-TPR from a value corresponding to the reset value based on the subsequently received TPR commands 201. Note, if the reset value of the authorized-TPR falls below the target-TPR by more than the threshold (T), the fast ramp up may be enabled allowing the authorized-TPR to ignore the down TPR commands and reach the target-TPR or reach within the threshold (T) in an efficient manner, in accordance with an embodiment.

The authorized-TPR value from processing block 203 is communicated to a processing block 204 for determining whether fast ramp should be enabled. The authorized-TPR may be compared to the target-TPR received from processor block 202. If the authorized-TPR is less than the target-TPR, or less than the target-TPR by a threshold amount (T), the fast ramp up is enabled. If the fast ramp up is enabled, the processor block 203 ignores the received down TPR commands in determining and adjusting the authorized-TPR, in accordance with an embodiment. Fast ramp up behavior of authorized-TPR may be made in a number of ways. In one example, the down TPR commands may be ignored by holding the authorized-TPR at the same value. In another example, the down and hold TPR commands may be ignored by increasing the authorized-TPR during the fast ramp up period. In yet another example, the hold TPR commands may be ignored by increasing the authorized-TPR. Other combinations may also be possible. In one example, one fast ramp up behavior may be followed when authorized-TPR is far below the target-TPR and another fast ramp up behavior when authorized-TPR reaches closer to the target-TPR, but not yet within the threshold (T). In FIG. 3, graph 303 is showing authorized-TRP with fast ramp up, and graph 302 in normal mode. The authorized-TRP in fast ramp up mode ignores the down TRP commands.

Figure 5:
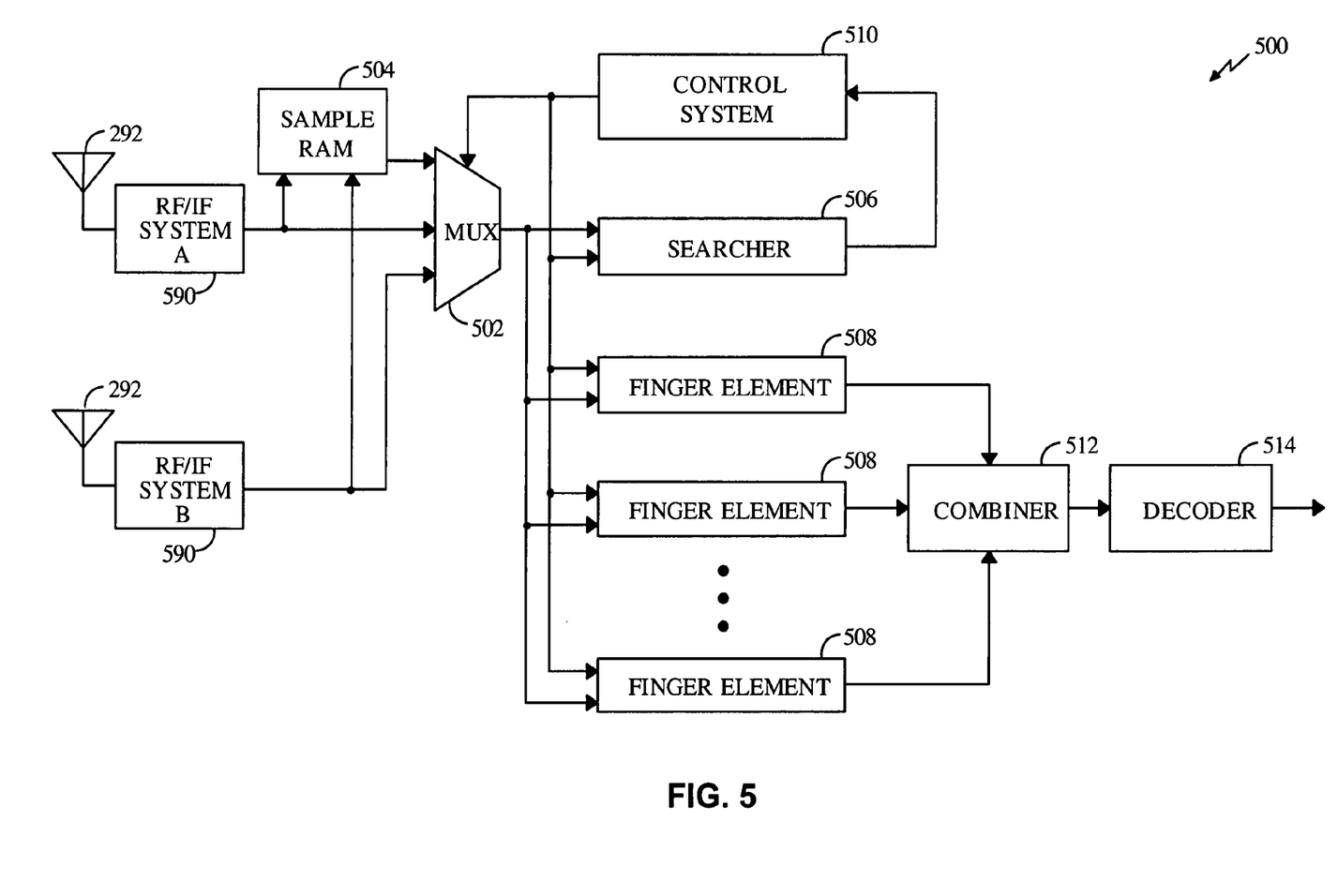
FIG. 5 depicts a block diagram of a receiver capable of operating in accordance with various aspects of the invention.

FIG. 5 illustrates a block diagram of a receiver 500 used for processing and demodulating received CDMA signal while operating in accordance with various aspects of the invention. Receiver 500 may be used for decoding the information on the reverse and forward links signals. Receiver 500 may be used for decoding information on the fundamental channel, control channel and supplemental channels. Receiver 500 may be used for processing signals carrying TPR commands while operating in accordance with various aspects of the invention. Received (Rx) samples may be stored in RAM 504. Receive samples are generated by a radio frequency/intermediate frequency (RF/IF) system 590 and an antenna system 592. The RF/IF system 590 and antenna system 592 may include one or more components for receiving multiple signals and RF/IF processing of the received signals for taking advantage of the receive diversity gain. Multiple received signals propagated through different propagation paths may be from a common source. Antenna system 592 receives the RF signals, and passes the RF signals to RF/IF system 590. RF/IF system 590 may be any conventional RF/IF receiver.

The received RF signals are filtered, down-converted and digitized to form RX samples at base band frequencies. The samples are supplied to a multiplexer (mux) 502. The output of mux 502 is supplied to a searcher unit 506 and finger elements 508. A control system 510 is coupled thereto to control various operations of receiver 500. A combiner 512 couples a decoder 514 to finger elements 508. Control system 510 may be a microprocessor controlled by software, and may be located on the same integrated circuit or on a separate integrated circuit. The decoding function in decoder 514 may be in accordance with a turbo decoder or any other suitable decoding algorithms.

During operation, received samples are supplied to mux 502. Mux 502 supplies the samples to searcher unit 506 and finger elements 508. Control unit 510 configures finger elements 508 to perform demodulation and despreading of the received signal at different time offsets based on search results from searcher unit 506. The results of the demodulation are combined and passed to decoder 514. Decoder 514 decodes the data and outputs the decoded data. Despreading of the channels is performed by multiplying the received samples with the complex conjugate of the PN sequence and assigned Walsh function at a single timing hypothesis and digitally filtering the resulting samples, often with an integrate and dump accumulator circuit (not shown). Such a technique is commonly known in the art.

Receiver 500 may be used in a receiver portion of base stations 101 and 160 for processing the received reverse link signals from the mobile stations, and in a receiver portion of any of the mobile stations for processing the received forward link signals.

The forward link signal may carry the TPR commands. The decoder 514 passes the TPR commands to various processing blocks shown in FIG. 2, for determining and adjusting the target-TPR and authorized-TPR in accordance with various aspects of the invention. The receiver 500 may be used in the base stations for decoding the reverse link signals that carry data channels at data rates and payload sizes determined by various processing blocks in FIG. 2.

The decoder 514 may accumulate the combined energy for detection of a data symbol. Each packet of data may carry a cyclic redundancy check (CRC) field. The decoder 514 may in connection with control system 510 and or other control systems check for error in the received data packet. If the CRC data does not pass, the received packet of data has been received in error. The receiver 500 may be implemented in many different ways, such as use of ASIC, DSP and microprocessor. The processing of the decoded data, however, may be performed by a processor in connection with the receiver 500. Such a processor may include various processing blocks shown in FIG. 2. Since the processing of received signal by receiver 500 is extensive and time critical, many aspects of the receiver 500 may be performed autonomously. For example, searching for pilot signal, demodulation and decoding of various signals, etc, maybe started and completed autonomously.

Transmission of a packet of data may need to be performed over several transmissions due to a failed CRC. If CRC of a received packet of data is failed, a new transmission of the same packet of data may take place once a negative acknowledgment is received from the destination. Such a process is commonly referred to as an ARQ instance. During the time an acknowledgement or a negative acknowledgement is received, new packets may be transmitted by the mobile station while the previous packet is still pending a retransmission. Each transmission of a packet is referred as a subpacket.

Sub-packet transmissions are interlaced such as to allow sufficient time for the base station to feed back an acknowledgement for the next subpacket. For example, the mobile station may first transmits sub-packet 0 of packet A ("A,0"). While it waits for an ACK for packet A, it starts transmitting subpackets 0 of packets B, C, and D. Up to 4 different packets may therefore conceptually be in transit at any given time; such a condition may refer to as having 4 ARQ instances. Each thread of packet transmission is therefore referred to as an ARQ instance. In an ARQ instance, a few retransmissions may take place for transmission of a packet of data. In accordance with various aspects of the invention, the same authorized-TPR may be used for all retransmissions in one ATQ instance. Therefore, the processing block 203 maintains an authorized-TPR per ARQ instance. The updates of the authorized-TPR at each received TPR command, whether in fast ramp up mode (graph 303) or normal tracking mode (graph 302) of received TPR commands, may take place per ARQ instance.

In the fast-ramp up mode, the authorized-TPR may be increased more aggressively than when the mobile station is not in the fast ramp-up mode. In the embodiment considered, the authorized-TPR is updated such that the selected payload size jumps up to the next payload size when an up or a hold command is received while down commands are ignored during fast ramp-up. In another embodiment, a different set of step-up and step-down values may be used during the fast ramp-up. Step-up during fast ramp-up may be steeper while the step-down response during fast ramp-up may be either absent or very gradual. In such a case with fast ramp up enabled, a down TPR command would bring down the authorized-TPR by a less amount than an up command raising the authorized-TPR. In another exemplary embodiment, different step-up and step-down values during fast ramp-up may be used by different mobile stations. The mobile stations with higher priority may have bigger step-up values as compared to mobile stations with lower priority.

As such, in one embodiment, an up TPR command may indicate a fractional increase in the value of authorized-TPR. For example, an up TPR command may amount to an increase of one fourth of the dB difference between two adjacent indexes as shown in table 400. In such a case, four up TPR commands may tantamount to a change of the index upward by one level, and, correspondingly, the authorized-TPR. Similarly, a down TPR command may indicate a fractional decrease in the value of authorizes-TPR. For example, a down TPR command may amount to a decrease of one fourth of the dB difference between two adjacent indexes as shown in table 400. In such a case, four down TPR commands may tantamount to a change of the index downward by one level, and, correspondingly, the authorized-TPR. In another embodiment, the fractional upward and downward values corresponding to each received TPR command may be different in an asymmetrical fashion. For example, four down TPR commands may lower the authorized-TPR by one index, and seven up TPR commands may increase the authorized-TPR by one index.

Figure 6:
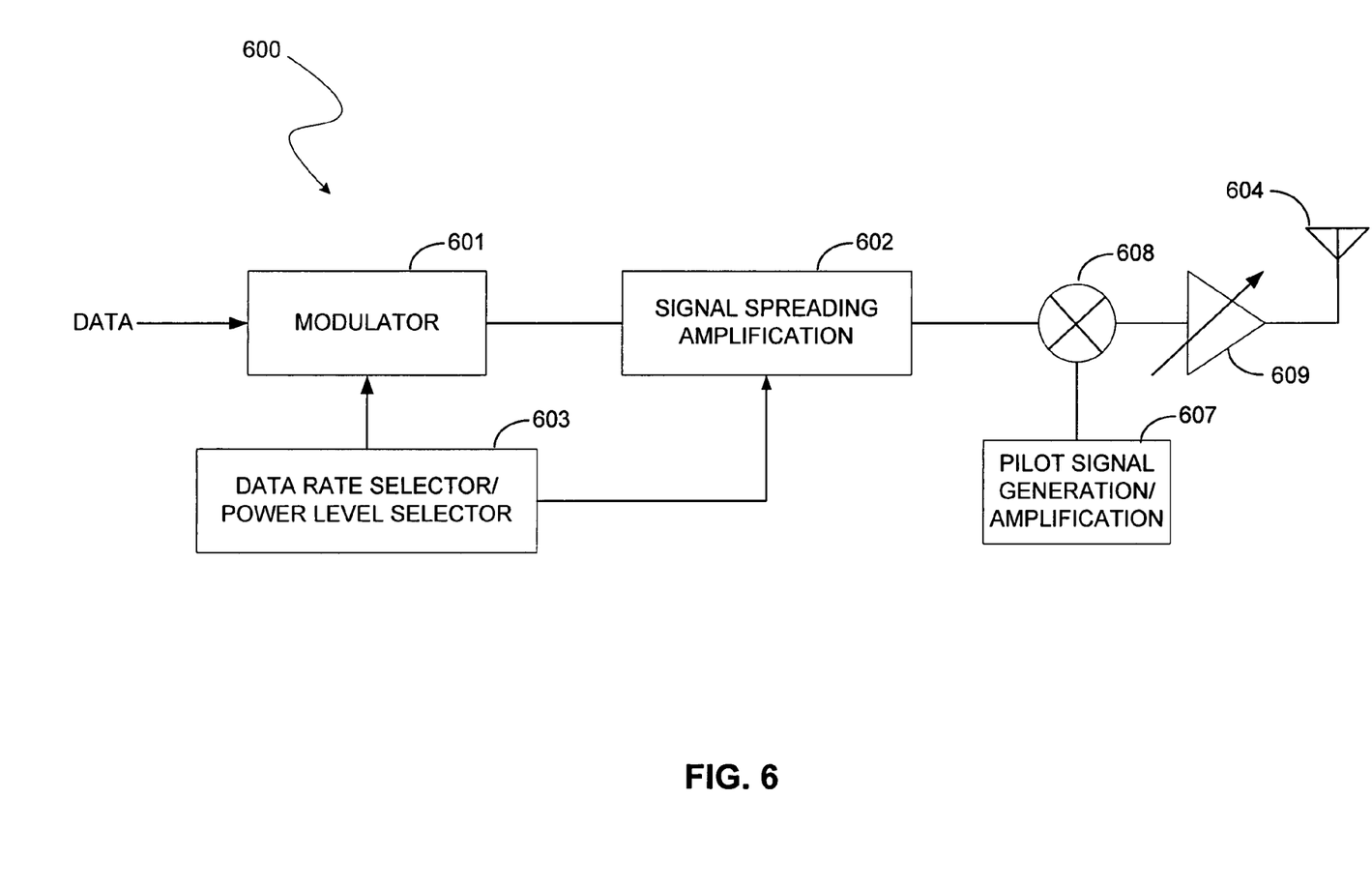
FIG. 6 depicts a block diagram of a transmitter capable of operating in accordance with various aspects of the invention.

FIG. 6 illustrates a block diagram of a transmitter 600 for transmitting the reverse and forward link signals. The channel data for transmission are input to a modulator 601 for modulation. The modulation may be according to any of the commonly known modulation techniques such as QAM, PSK or BPSK. The data is encoded at a data rate in modulator 601. The data rate may be selected by a data rate and power level selector 603. The data rate selection may be based on the authorized-TPR information. The frame transmission may be fixed, such as 10 msec. The authorized-TPR is referenced via table 400. The content of table 400 may be downloaded or uploaded into the transmitter 600. The information in table 400 may change from time to time, or may be different among different mobile stations in the communication system 100. The processing blocks 203 and 205 shown in FIG. 2 may interface block 603 to determine the data rate and payload size. The amount of input data is selected in accordance with the selected payload size received from processing block 205. The data rate is selected correspondingly. If the payload size selected corresponds to a payload size with a lower TPR, the processing block 205 informs the processing block 203 to make the adjustments accordingly, as explained herein. The data rate and power level selector 603 accordingly selects the data rate in modulator 601. The output of modulator 601 passes through a signal spreading operation and amplified in a block 602 for transmission from an antenna 604. A pilot channel is also generated in a block 607. The pilot channel is amplified to an appropriate level in block 607. The pilot channel power level may be in accordance with the channel condition at the receiving destination and in accordance with commonly known power control schemes. The data rate and power level selector 603 also selects a power level for the amplification level of the traffic channel in accordance with the authorized-TPR command, while knowing the pilot channel power level. The combination of the selected data rate and the power level of the traffic channel with respect to the pilot channel allows proper decoding of the transmitted data at the receiving destination. The pilot signal is combined with the channel signal in a combiner 308. The combined channels may be amplified in an amplifier 609 and transmitted from antenna 604. The antenna 604 may be in any number of combinations including antenna arrays and multiple input multiple output configurations.

Figure 7:
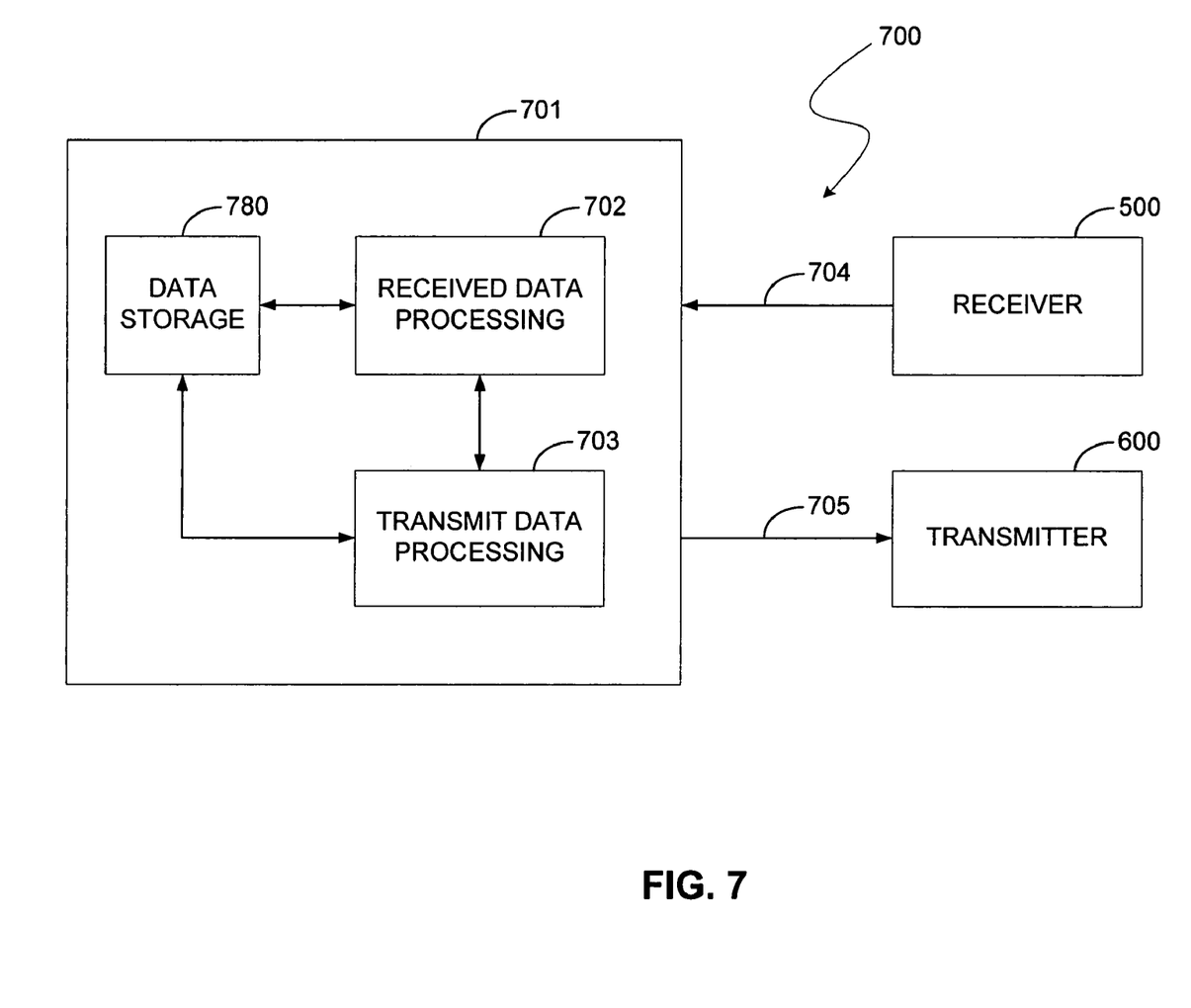
FIG. 7 depicts a transceiver system for transmitting and receiving data while operating in accordance with various aspects of the invention.

FIG. 7 depicts a general diagram of a transceiver system 700 for incorporating receiver 500 and a transmitter 600 for maintaining a communication link with a destination, including processing of received TPR commands, determining and adjusting target-TPR and authorized-TPR, selecting a payload size for transmission of a packet of data, as described herein and more particularly in relation to various aspects of the operations shown in FIG. 2. Transceiver 700 maybe incorporated in the mobile stations and/or base stations. A processor 701 may be coupled to receiver 500 and transmitter 600 to process the received and transmitted data. Various aspects of the receiver 500 and transmitter 600 may be common, even though receiver 500 and transmitter 600 are shown separately. In one aspect, receiver 500 and transmitter 600 may share a common local oscillator and a common antenna system (not shown) for RF/IF receiving and transmitting. Transmitter 600 receives the data for transmission on input 705. Transmit data processing block 703 prepares the data for transmission on a transmit channel. The transmit channel may be a traffic channel. The size of the payload data passed on to transmitter via input 705 may be selected in accordance with various aspects of the invention. Received data, after being decoded in decoder 514, are received at processor 701 at an input 704. Received data are processed in received data processing block 702 in processor 701. Various operations of processor 701 may be integrated in a single or multiple processing units. The received data may include received TPR commands. The transceiver 700 may be connected to another device. The transceiver 700 may be an integral part of the device. The device may be a computer or operates similar to a computer. The device may be connected to a data network, such as Internet. In case of incorporating the transceiver 700 in a base station, the base station through several connections may be connected to a network, such as Internet.

The processing of the received data generally includes checking for error in the received packets of data. The data storage block 780 may accumulate data received in each packet of data to reconstruct the entire block of data. The data storage block 780 may store data for transmissions. The data for transmissions is passed on to transmit data processing block 703. The processor 701 in connection with received data processing block 702 and transmit data processing block 703 may perform various aspects of operations described herein and in particular in relation to various blocks shown in FIG. 2 in accordance with various aspects of the invention. For example, the received TPR commands may be passed on from received data processing block 702 to transmit data processing block 703. The processor 401 determines the payload size for the next transmission. The transmit data processing block selects sufficient amount of data from data storage block 780 to form a payload size comparable to the selected payload size, considering overhead bits, etc. The data is passed on to transmitter 600 for modulation, data rate selection, power level adjustments, etc. The packet of data is then transmitted from transmitter 600.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A method for controlling data rate of reverse link communications by a mobile station in a communication system, comprising:
    determining, by the mobile station, a target traffic to pilot channel power ratio (target-TPR);
    determining, by the mobile station, whether to follow a fast-ramp-up behavior in adjusting a value of an authorized traffic to pilot channel power ratio (authorized-TPR) for said reverse link communications, wherein said authorized-TPR corresponds to at least a range of payload sizes and communication data rates for said reverse link communications, and wherein following the fast-ramp-up behavior causes the authorized-TPR to approach said target-TPR based on received TPR commands faster than not following the fast-ramp-up behavior; and
    adjusting, by the mobile station, the value of said authorized-TPR in accordance with said determination of whether to follow the fast-ramp-up behavior.

2. The method as recited in claim 1 wherein said determining whether to follow said fast-ramp-up behavior of said authorized-TPR includes:
    comparing said target-TPR to said authorized-TPR;
    following said fast-ramp-up behavior when said determined authorized-TPR is less than said target-TPR.

3. The method as recited in claim 1 wherein said determining whether to follow said fast-ramp-up behavior of said authorized-TPR includes:
    comparing said target-TPR to said authorized-TPR;
    following said fast-ramp-up behavior when said determined authorized-TPR is less than said target-TPR by a threshold-TPR.

4. A method for controlling data rate of reverse link communications by a mobile station in a communication system, comprising:
    determining, by the mobile station, a target traffic to pilot channel power ratio (target-TPR);
    determining, by the mobile station, whether to follow a fast-ramp-up behavior in adjusting a value of an authorized traffic to pilot channel power ratio (authorized-TPR) for said reverse link communications, wherein said authorized-TPR corresponds to at least a range of payload sizes and communication data rates for said reverse link communications;
    receiving, by the mobile station, a TPR command; and
    in a condition other than when said fast-ramp-up behavior is followed, adjusting, by the mobile station, said value of said authorized-TPR up, down or hold in accordance with a value of said received TPR command; and
    in a condition when said fast-ramp up behavior is followed and said received TPR command includes at least one down TPR command, modifying, by the mobile station, said adjusting of said value of said authorized-TPR by excluding any adjustments in accordance with said least one down TPR command.

5. The method as recited in claim 1 wherein said adjusting of said value of said authorized-TPR occurs once in every automatic repeat request (ARQ) instance in said reverse link communications.

6. The method as recited in claim 4 further comprising:
    adjusting, by the mobile station, a value of said target-TPR up, down or hold in accordance with a value of said received TPR command.

7. The method as recited in claim 6 wherein said adjusting of said target-TPR occurs at every transmission time frame.

8. The method as recited in claim 1 further comprising:
selecting, by the mobile station, a payload size from said range of payload sizes based on said authorized-TPR;
communicating, by the mobile station, in accordance with said selected payload size on said reverse link communications.

9. The method as recited in claim 4, further comprising:
selecting, by the mobile station, a payload size from said range of payload sizes based on said authorized-TPR;
wherein said selected payload size is less than a maximum payload size in said range of payload sizes, further comprising:
resetting, by the mobile station, said authorized-TPR to a value corresponding to the authorized-TPR of said selected payload size;
wherein said adjusting said authorized-TPR is from said reset value following said resetting.

10. An apparatus for controlling data rate of reverse link communications in a communication system, comprising:
means for determining a target traffic to pilot channel power ratio (target-TPR);
means for determining whether to follow a fast-ramp-up behavior in a means for adjusting a value of an authorized traffic to pilot channel power ratio (authorized-TPR) for said reverse link communications, wherein said authorized-TPR corresponds to at least a range of payload sizes and communication data rates for said reverse link communications, and wherein following the fast-ramp-up behavior causes the authorized-TPR to approach said target-TPR based on received TPR commands faster than not following the fast-ramp-up behavior; and
means for adjusting the value of said authorized-TPR in accordance with said determination of whether to follow the fast-ramp-up behavior.

11. The apparatus as recited in claim 10 wherein said means for determining whether to follow said fast-ramp-up behavior of said authorized-TPR includes:
means for comparing said target-TPR to said authorized-TPR;
means for following said fast-ramp-up behavior when said determined authorized-TPR is less than said target-TPR.

12. The apparatus as recited in claim 10 wherein said means for determining whether to follow said fast-ramp-up behavior of said authorized-TPR includes:
means for comparing said target-TPR to said authorized-TPR;
means for following said fast-ramp-up behavior when said determined authorized-TPR is less than said target-TPR by a threshold-TPR.

13. An apparatus for controlling data rate of reverse link communications in a communication system, comprising:
means for determining a target traffic to pilot channel power ratio (target-TPR); and
means for determining whether to follow a fast-ramp-up behavior in a means for adjusting a value of an authorized traffic to pilot channel power ratio (authorized-TPR) for said reverse link communications, wherein said authorized-TPR corresponds to at least a range of payload sizes and communication data rates for said reverse link communications;
a receiver for receiving a TPR command;
wherein said means for adjusting said authorized-TPR includes:
in a condition other than when said fast-ramp-up behavior is followed, said means for adjusting includes means for changing a value of said authorized-TPR up, down or hold in accordance with a value of said received TPR command;
in a condition when said fast-ramp up behavior is followed and said received TPR command includes at least one down TPR command, modifying said means for adjusting of said value of said authorized-TPR by allowing to exclude any adjustments in accordance with said least one down TPR command.

14. The apparatus as recited in claim 10 wherein said means for adjusting of said value of said authorized-TPR includes means for adjustments to occur once in every automatic repeat request (ARQ) instance in said reverse link communications.

15. The apparatus as recited in claim 13 further comprising:
means for adjusting a value of said target-TPR up, down or hold in accordance with a value of said received TPR command.

16. The apparatus as recited in claim 15 wherein said means for adjusting of said target-TPR includes means for adjustments to occur at every transmission time frame.

17. The apparatus as recited in claim 10 further comprising:
means for selecting a payload size from said range of payload sizes based on said authorized-TPR;
a transmitter for communicating in accordance with said selected payload size on said reverse link communications.

18. The apparatus as recited in claim 13, further comprising:
means for selecting a payload size from said range of payload sizes based on said authorized-TPR;
wherein said selected payload size is less than a maximum payload size in said range of payload sizes, further comprising:
means for resetting said authorized-TPR to a value corresponding to the authorized-TPR of said selected payload size;
wherein said means for adjusting said authorized-TPR includes means for continuing adjustments from said reset value following said resetting.

19. A computer-readable medium encoded with computer executable code, which, when executed by a computer, cause the computer to perform operations for controlling data rate of reverse link communications in a communication system comprising:
program code to determine a target traffic to pilot channel power ratio (target-TPR); and
program code to determine whether to follow a fast-ramp-up behavior in adjusting a value of an authorized traffic to pilot channel power ratio (authorized-TPR) for said reverse link communications, wherein said authorized-TPR corresponds to at least a range of payload sizes and communication data rates for said reverse link communications, and wherein following the fast-ramp-up behavior causes the authorized-TPR to approach said target-TPR based on received TPR commands faster than not following the fast-ramp-up behavior; and
program code to adjust the value of said authorized-TPR in accordance with said determination of whether to follow the fast-ramp-up behavior.

20. The computer-readable medium as recited in claim 19 wherein said program code to determine whether to follow said fast-ramp-up behavior of said authorized-TPR includes:
program code to compare said target-TPR to said authorized-TPR; and program code to follow said fast-ramp-up behavior when said determined authorized-TPR is less than said target-TPR.

21. The computer-readable medium as recited in claim 19 further comprising:
program code to receive one or more TPR commands;
wherein said program code to adjust said authorized-TPR includes:
in a condition other than when said fast-ramp-up behavior is followed, said program code to adjust includes program code to change a value of said authorized-TPR up, down or hold in accordance with a value of said received TPR commands; and
in a condition when said fast-ramp up behavior is followed and said received TPR commands include at least one down TPR command, program code to modify said value of said authorized-TPR by excluding any adjustments in accordance with said least one down TPR command.

22. The computer-readable medium as recited in claim 19 further comprising:
program code to select a payload size from said range of payload sizes based on said authorized-TPR; and
program code to communicate in accordance with said selected payload size on said reverse link communications.

23. An apparatus for controlling data rate of reverse link communications in a communication system, the apparatus comprising:
a processor configured to:
determine a target traffic to pilot channel power ratio (target-TPR), and
determine whether to follow a fast-ramp-up behavior in adjusting a value of an authorized traffic to pilot channel power ratio (authorized-TPR) for said reverse link communications, wherein said authorized-TPR corresponds to at least a range of payload sizes and communication data rates for said reverse link communications, and wherein following the fast-ramp-up behavior causes the authorized-TPR to approach said target-TPR based on received TPR commands faster than not following the fast-ramp-up behavior; and
adjust the value of said authorized-TPR in accordance with said determination of whether to follow the fast-ramp-up behavior; and
a memory coupled to the processor for storing data.

24. The apparatus as recited in claim 23 wherein the processor configured to determine whether to follow said fast-ramp-up behavior of said authorized-TPR is further configured to:
compare said target-TPR to said authorized-TPR; and
follow said fast-ramp-up behavior when said determined authorized-TPR is less than said target-TPR.

25. The apparatus as recited in claim 23 further comprising:
a receiver to receive one or more TPR commands;
wherein the processor configured to adjust said authorized-TPR further includes:
in a condition other than when said fast-ramp-up behavior is followed, said processor being configured to change a value of said authorized-TPR up, down or hold in accordance with a value of said received TPR commands; and
in a condition when said fast-ramp up behavior is followed and said received TPR commands include at least one down TPR command, said processor being configured to modify said value of said authorized-TPR by excluding any adjustments in accordance with said least one down TPR command.

26. The apparatus as recited in claim 23, wherein the processor is further configured to:
select a payload size from said range of payload sizes based on said authorized-TPR: and
communicate in accordance with said selected payload size on said reverse link communications.

* * * * *